US011667391B2

(12) United States Patent
Thomassin et al.

(10) Patent No.: US 11,667,391 B2
(45) Date of Patent: Jun. 6, 2023

(54) DUAL ENGINE HYBRID-ELECTRIC AIRCRAFT

(71) Applicants: Pratt & Whitney Canada Corp., Longueuil (CA); Hamilton Sundstrand Corporation, Charlotte, NC (US)

(72) Inventors: Jean Thomassin, Ste Julie (CA); Todd A. Spierling, Rockford, IL (US)

(73) Assignees: Pratt & Whitney Canada Corp., Longueuil (CA); Hamilton Sundstrand Corporation, Charlotte, NC (US)

( * ) Notice: Subject to any disclaimer, the term of this patent is extended or adjusted under 35 U.S.C. 154(b) by 274 days.

(21) Appl. No.: 17/002,715

(22) Filed: Aug. 25, 2020

(65) Prior Publication Data

US 2021/0300576 A1   Sep. 30, 2021

Related U.S. Application Data

(60) Provisional application No. 62/891,738, filed on Aug. 26, 2019.

(51) Int. Cl.
*B64D 27/24* (2006.01)
*B64D 35/08* (2006.01)
*B64D 27/02* (2006.01)

(52) U.S. Cl.
CPC ............ *B64D 27/24* (2013.01); *B64D 35/08* (2013.01); *B64D 2027/026* (2013.01)

(58) Field of Classification Search
CPC ... B64D 2027/026; B64D 27/24; B64D 35/08
(Continued)

(56) References Cited

U.S. PATENT DOCUMENTS 6,703,747 B2   3/2004 Kawamura
6,864,667 B2   3/2005 Buening et al.
(Continued)

FOREIGN PATENT DOCUMENTS

BR   PI0622106 A2   12/2011
DE   102010021026 A1   11/2011
(Continued)

OTHER PUBLICATIONS

Extended European Search Report dated Jan. 28, 2021, issued during the prosecution of European Patent Application No. EP 20192934.6.
(Continued)

*Primary Examiner* — Brady W Frazier
(74) *Attorney, Agent, or Firm* — Locke Lord LLP; Scott D. Wofsy; Alicia J. Carroll

(57) ABSTRACT

An aircraft propulsion system includes at least one hybrid-electric power plant for delivering power to an air mover for propelling an aircraft. The at least one hybrid-electric power plant includes a first thermal engine and an electrical motor arranged in a parallel drive configuration or in an in-line drive configuration. The aircraft propulsion system includes a second thermal engine operatively connected to the electrical motor to power the electrical motor. A method for providing propulsion to an aircraft includes delivering power to an air mover for propelling the aircraft with at least one hybrid-electric power plant. The at least one hybrid-electric power plant includes a first thermal engine and an electrical motor arranged in a parallel drive configuration or in an in-line drive configuration. The method includes powering the electrical motor with a second thermal engine.

7 Claims, 1 Drawing Sheet

(58) Field of Classification Search
USPC .......................................................... 244/55
See application file for complete search history.

(56) References Cited

U.S. PATENT DOCUMENTS

| | | |
|---|---|---|
| 7,122,933 B2 | 10/2006 | Horst et al. |
| 7,915,778 B2 | 3/2011 | Miyata et al. |
| 8,350,437 B2 | 1/2013 | Doushita et al. |
| 8,358,046 B2 | 1/2013 | Platon |
| 8,368,276 B2 | 2/2013 | Wolf et al. |
| 8,532,961 B2 | 9/2013 | Guo |
| 8,844,143 B2 | 9/2014 | Kirchner et al. |
| 9,174,741 B2 | 11/2015 | Suntharalingam et al. |
| 10,145,291 B1 | 12/2018 | Thomassin et al. |
| 10,170,954 B2 | 1/2019 | Taniguchi et al. |
| 10,326,326 B2 | 6/2019 | Laldin et al. |
| 10,494,117 B2 | 12/2019 | Bosma |
| 2005/0237766 A1 | 10/2005 | Klettke |
| 2008/0017426 A1 | 1/2008 | Walters et al. |
| 2008/0078876 A1 | 4/2008 | Baggette et al. |
| 2008/0141921 A1 | 6/2008 | Hinderks |
| 2010/0251692 A1 | 10/2010 | Kinde, Sr. |
| 2010/0270417 A1 | 10/2010 | Goldshteyn |
| 2011/0024555 A1 | 2/2011 | Kuhn, Jr. |
| 2011/0049293 A1 | 3/2011 | Koletzko |
| 2012/0012692 A1 | 1/2012 | Kroo |
| 2012/0111994 A1 | 5/2012 | Kummer et al. |
| 2012/0227389 A1 | 9/2012 | Hinderks |
| 2013/0020429 A1 | 1/2013 | Kroo |
| 2013/0068876 A1 | 3/2013 | Radu |
| 2013/0147204 A1* | 6/2013 | Botti ..................... F02B 63/04 903/903 |
| 2013/0157017 A1 | 6/2013 | Guillemaut et al. |
| 2014/0180507 A1 | 6/2014 | Geay et al. |
| 2015/0183518 A1 | 7/2015 | Stuckl et al. |
| 2015/0210407 A1 | 7/2015 | Griffin et al. |
| 2015/0321752 A1 | 11/2015 | Trull et al. |
| 2016/0023747 A1 | 1/2016 | Kempshall |
| 2016/0144957 A1 | 5/2016 | Claridge et al. |
| 2016/0221680 A1 | 8/2016 | Burton et al. |
| 2016/0272310 A1 | 9/2016 | Chan et al. |
| 2016/0304199 A1 | 10/2016 | Chan et al. |
| 2016/0347446 A1 | 12/2016 | Vetter et al. |
| 2017/0029131 A1* | 2/2017 | Steinwandel .......... B64D 27/24 |
| 2017/0320585 A1 | 11/2017 | Armstrong et al. |
| 2017/0341725 A1 | 11/2017 | Skahan |
| 2018/0037333 A1* | 2/2018 | Willford ................. F02C 6/206 |
| 2018/0127103 A1 | 5/2018 | Cantemir |
| 2018/0141655 A1 | 5/2018 | Wall |
| 2018/0208305 A1 | 7/2018 | Lloyd et al. |
| 2018/0215462 A1 | 8/2018 | Fenny et al. |
| 2020/0148373 A1* | 5/2020 | Long ...................... B64D 27/02 |

FOREIGN PATENT DOCUMENTS

| | | |
|---|---|---|
| DE | 102014224637 A1 * | 6/2016 |
| EP | 3594125 A1 | 1/2020 |
| EP | 3650353 A1 | 5/2020 |
| GB | 2497136 A | 6/2013 |
| JP | 2014159255 A | 9/2014 |
| KR | 200408970 Y1 | 2/2006 |
| KR | 20070039699 A | 4/2007 |
| KR | 20150018018 A | 2/2015 |
| KR | 101513661 B | 4/2015 |
| KR | 101659783 B1 | 9/2016 |
| KR | 101752859 B1 | 6/2017 |
| WO | 2009053649 A1 | 4/2009 |
| WO | 2010020199 A1 | 2/2010 |
| WO | 2011005066 A2 | 1/2011 |
| WO | 2018058137 A1 | 3/2018 |
| WO | 2018099856 A1 | 6/2018 |
| WO | 2018104929 A1 | 6/2018 |
| WO | WO2017126584 A1 | 12/2018 |

OTHER PUBLICATIONS

Communication Pursuant to Art 94(3) EPC dated Aug. 1, 2022, issued during the prosecution of European Patent Application No. EP 20192934.6, 6 pages.

* cited by examiner

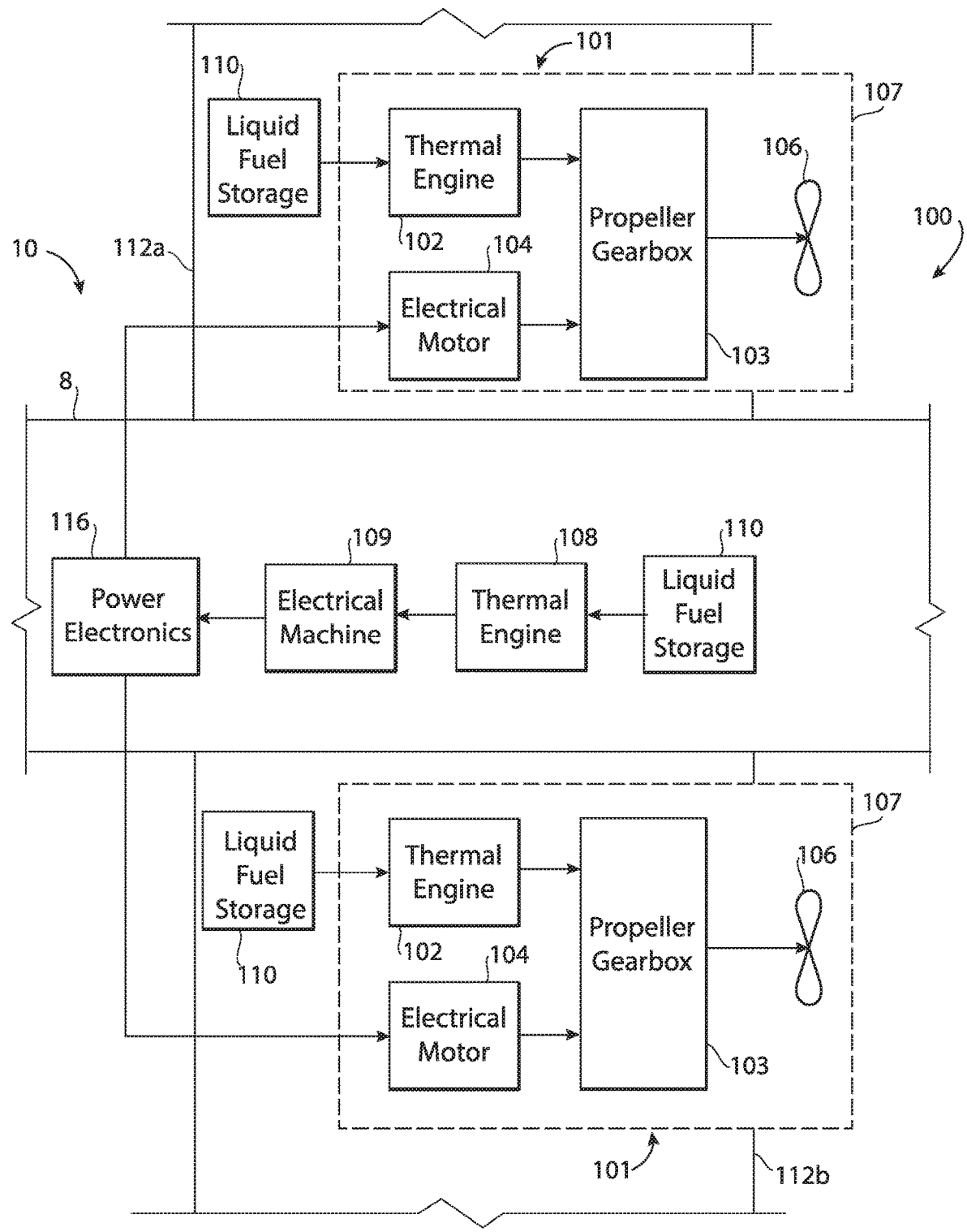

DUAL ENGINE HYBRID-ELECTRIC AIRCRAFT

CROSS-REFERENCE TO RELATED APPLICATIONS

This application claims priority to and the benefit of U.S. Provisional Application No. 62/891,738, filed Aug. 26 2019, the entire contents of which are herein incorporated by reference in their entirety.

BACKGROUND OF THE INVENTION

1. Field of the Invention

The subject invention is directed to propulsion configurations in aircraft, and more particularly to an aircraft having mixed drive systems, including hybrid-electric propulsion systems.

2. Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electrical motor are indeed adaptable for use with commercial passenger aircraft and can provide efficiency benefits including reduced fuel consumption. The subject invention is directed to aircraft having such propulsion systems.

SUMMARY

An aircraft propulsion system includes at least one hybrid-electric power plant for delivering power to an air mover for propelling an aircraft. The at least one hybrid-electric power plant includes a first thermal engine and an electrical motor arranged in a parallel drive configuration or in an in-line drive configuration. The aircraft propulsion system includes a second thermal engine operatively connected to the electrical motor to power the electrical motor.

In some embodiments, the aircraft propulsion system includes a fuel storage in fluid communication with the thermal engine to provide fuel thereto. The aircraft propulsion system can include an electrical machine operatively connected to be powered by the second thermal engine. The aircraft propulsion system can include a power conversion electronics system operatively connected to the electrical machine between the electrical machine and the electrical motor of the at least one hybrid-electric power plant.

The hybrid-electric power plant can be positioned on a first wing of the aircraft. The aircraft propulsion system can include an additional hybrid-electric power plant positioned on a wing of the aircraft opposite from the first wing of the aircraft. The additional hybrid electric power plant can be operatively connected to the second thermal engine to receive electrical power therefrom.

In accordance with another aspect, a method for providing propulsion to an aircraft includes delivering power to an air mover for propelling the aircraft with at least one hybrid-electric power plant. The at least one hybrid-electric power plant includes a first thermal engine and an electrical motor arranged in a parallel drive configuration or in an in-line drive configuration. The method includes powering the electrical motor with a second thermal engine.

The method can include providing fuel from a fuel storage to the thermal engine. The method can include powering an electrical machine with the second thermal engine. The method can include powering the electrical motor of the at least one hybrid-electric power plant with power from the electrical machine. The method can include powering the additional hybrid electric power plant with the second thermal engine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic depiction of an embodiment of an aircraft propulsion system constructed in accordance with the present disclosure, showing a hybrid-electric power plant having a first thermal engine and an electrical motor, and a second thermal engine operatively connected to the electrical motor of the hybrid-electric power plant.

DETAILED DESCRIPTION

Reference will now be made to the drawings wherein like reference numerals identify similar structural features or aspects of the subject disclosure. For purposes of explanation and illustration, and not limitation, an embodiment of an aircraft propulsion system in accordance with the disclosure is shown in FIG. 1 and is designated generally by reference character 100. Embodiments of systems in accordance with the disclosure, or aspects thereof, as will be described, facilitate an aircraft propulsion system (e.g. a hybrid-electric propulsion system) having reduced weight and reduced size as compared to hybrid-electric propulsion systems that rely on battery energy storage to power the electric power leg of the hybrid-electric power plant.

As shown in FIG. 1, an aircraft propulsion system 100, e.g. a parallel hybrid-electric propulsion system, includes a hybrid electric power plant 101 on a wing 112a. The hybrid-electric power plant includes a first thermal engine 102, e.g. a fuel burning powertrain leg, an electrical motor 104, e.g. an electric power train leg, arranged in a parallel drive configuration to drive an air mover 106 for propelling an aircraft 10. Those skilled in the art will readily appreciate that the fuel burning leg and the electric power train leg can also be arranged in an in-line drive configuration. Air mover 106 is operatively connected to electrical motor 104 and to thermal engine 102 by way of a gearbox 103. Air mover 106 can be a propeller, fan or the like.

With continued reference to FIG. 1, the aircraft propulsion system 100 includes a second thermal engine 108 operatively connected to the electrical motor 104 via electrical machine 109 and a power conversion electronics system, e.g. power electronics 116, to power the electrical motor 104. The electrical machine 109 of system 100 generates electrical power for electrical motor 104. Electrical machine 109 is operatively connected to be driven by the second thermal engine 108. Second engine 108 can be any suitable device that converts aircraft fuel into mechanical energy to drive electrical machine 109. In other words, the propulsion system 100 is "dual" engine in the sense that hybrid-electric power plant includes a first engine 102 and the electrical motor 104 is powered by a second thermal engine 108. By having a second thermal engine 108 (e.g. a fuel burning engine) operatively connected to the electrical motor 104, a battery storage is not required. This provides a reduced weight and reduced volume option for powering electrical motor 104, as batteries typically have lower energy density compared to fuel. The first thermal engine 102 is sized to provide the required aircraft cruise power, while the electrical motor 104 and the second thermal engine 108 are sized to provide augmentation for takeoff, climb, emergencies, or the like. As such, after the second thermal engine fuel burn for takeoff and climb, the overall weight for the energy storage for electrical motor 104 will be reduced compared to that in a battery powered system (as the weight of the batteries does not decrease upon use). It is contemplated that first and second thermal engines 102 and 108, respectively, could be a heat engine of any type, e.g., a gas turbine, spark ignited, diesel, rotary or reciprocating engine of any fuel type and with any configuration of turbomachinery elements, either turbocharger, turbosupercharger, supercharger and exhaust recovery turbo compounding, either mechanically, electrically, hydraulically or pneumatically driven.

As shown in FIG. 1, aircraft propulsion system 100 includes power electronics 116 operatively connected to the electrical machine 109 between electrical machine 109 and electrical motor 104 of the at least one hybrid-electric power plant 101. Power electronics 116 can include a variety of components, including rectifiers, inverters, or the like to convert power, throttle power, or the like. In some embodiments, power electronics 116 may not be necessary depending on the type of electrical machine 109 used. For example, if electrical machine 109 is a permanent magnet generator or an induction generator, or depending on the ability and/or desire to throttle speed for second thermal engine 108, power electronics 116 may not be needed. Fuel storages 110 are in fluid communication with first and second thermal engines 102 and 108, respectively, to provide fuel thereto. Those skilled in the art will readily appreciate that fuel storages 110 can be a single holding tank on wings 112a or 112b, or fuselage 8, or can include multiple holding tanks in one or more of wings 112a or 112b, or fuselage 8. In other words, a single tank 110 can provide fuel to both first and second thermal engines 102 and 108, respectively, or each thermal engine 102 can have their own fuel tank.

With continued reference to FIG. 1, system 100 is shown with two hybrid-electric power plants 101. A first hybrid-electric power plant 101 is positioned on a first wing 112a and an additional hybrid-electric power plant 101 is positioned on a second wing 112b of the aircraft 10. Additional hybrid-electric power plant 101 is positioned on second wing 112b of aircraft 10 opposite from first wing 112a across fuselage 8 of aircraft 10. Additional hybrid electric power plant 101 is operatively connected to the same second thermal engine 108 as hybrid electric power plant 101 on wing 112a to receive electrical power therefrom. In this manner, there can be a single "second" thermal engine 108 located, for example, in fuselage 8, that provides electric power to both electrical motor 104 on wing 112a and another electrical motor 104 on wing 112b.

Those skilled in the art will readily appreciate that portions of the hybrid-electric power plant 101 (e.g. the air mover 106, electrical motor 104, gear box 103, and/or thermal engine 102) can be positioned in a nacelle (indicated schematically by box 107) on a given wing (e.g. one or more of wings 112a and 112b) of an aircraft 10. In some embodiments, second thermal engine 108, electrical machine 109 and power electronics 116 can be located in the fuselage 8, or portions thereof can be located in a wing space or on one of wings 112a or 112b.

A method for providing propulsion to an aircraft, e.g. aircraft 10, includes delivering power to an air mover, e.g. air mover 106, for propelling the aircraft with at least one hybrid-electric power plant, e.g. hybrid electric power plant 101, where the hybrid electric power plant includes a first thermal engine, e.g. first thermal engine 102. The method includes powering an electrical motor, e.g. electrical motor 104, with a second thermal engine, e.g. second thermal engine 108. The method includes providing fuel from a fuel storage, e.g. fuel storage 110, to the thermal engine, e.g. thermal engine 102. The method includes powering an electrical machine, e.g. electrical machine 109, with the second thermal engine. The method includes powering the electrical motor of the at least one hybrid-electric power plant with power from the electrical machine. The method includes powering an additional hybrid electric power plant, e.g. similar to hybrid electric power plant 101, with the second thermal engine.

The methods and systems of the present disclosure, as described above and shown in the drawings, provide for reduced weight, and reduced size, which results in reduced fuel consumption. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft propulsion system, comprising:
   first and second hybrid-electric power plants for delivering power to respective air movers for propelling an aircraft, wherein each hybrid-electric power plant includes a respective thermal engine and a respective electrical motor arranged in a parallel drive configuration; and
   a second thermal engine operatively connected to the electrical motor of the first hybrid-electric power plant and the electrical motor of the second hybrid-electric power plant through an electrical machine and a power conversion electronics system to power the electrical motors of the first and second hybrid-electric power plants.

2. The aircraft propulsion system as recited in claim 1, further comprising a fuel storage in fluid communication with each thermal engine to provide fuel thereto.

3. The aircraft propulsion system as recited in claim 1, wherein the power conversion electronics system is operatively connected to the electrical machine between the electrical machine and the respective electrical motors of the first and second hybrid-electric power plants.

4. The aircraft propulsion system as recited in claim 1, wherein the first hybrid-electric power plant is positioned on a first wing of the aircraft.

5. The aircraft propulsion system as recited in claim 4, wherein the second hybrid-electric power plant is positioned on a wing of the aircraft opposite from the first wing of the aircraft.

6. A method for providing propulsion to an aircraft comprising:
- delivering power to respective air movers for propelling the aircraft with first and second hybrid-electric power plants, wherein each hybrid-electric power plant includes a respective thermal engine and a respective electrical motor arranged in a parallel drive configuration; and
- powering the electrical motor of the first hybrid-electric power plant and the electrical motor of the second hybrid-electric power plant with a second thermal engine through an electrical machine and a power conversion electronics system.

7. The method as recited in claim 6, providing fuel from a fuel storage to each thermal engine.

\* \* \* \* \*